(12) United States Patent
Huang

(10) Patent No.: US 7,431,450 B2
(45) Date of Patent: Oct. 7, 2008

(54) EYEGLASSES WITH A WIRELESS TRANSCEIVER SYSTEM

(76) Inventor: Hsueh Yu Huang, 5Fl., 100, Xiulang Road, Yonghe, Taipei County (TW)

(*) Notice: Subject to any disclaimer, the term of this patent is extended or adjusted under 35 U.S.C. 154(b) by 140 days.

(21) Appl. No.: 11/531,992

(22) Filed: Sep. 14, 2006

(65) Prior Publication Data

US 2007/0195258 A1    Aug. 23, 2007

(30) Foreign Application Priority Data

Feb. 21, 2006    (TW) .............................. 95202938 U

(51) Int. Cl.
*G00C 1/04*    (2006.01)

(52) U.S. Cl. ................... 351/103; 351/47; 351/133; 351/158

(58) Field of Classification Search .................. 351/47, 351/48, 57, 58, 103–109, 121, 124, 133, 351/158, 41, 44
See application file for complete search history.

(56) References Cited

U.S. PATENT DOCUMENTS

| 7,172,282 | B1* | 2/2007 | Lee | ............................. 351/103 |
| 2006/0158608 | A1* | 7/2006 | Lin | ............................. 351/158 |
| 2007/0121059 | A1* | 5/2007 | Chiou | ........................ 351/103 |

* cited by examiner

*Primary Examiner*—Huy K Mai

(57) ABSTRACT

A pair of eyeglasses includes an eyeglass frame, a nose unit fastened to the eyeglass frame with a screw, an eyeglass lens mounted in a mounting groove on the eyeglass frame and forced into engagement with the screw, two temples pivotally coupled to two coupling endpieces of the eyeglass frame, and a wireless transceiver mounted on one temple for allowing the user to use a cellular phone wirelessly in a hand-free manner.

10 Claims, 15 Drawing Sheets

US 7,431,450 B2

EYEGLASSES WITH A WIRELESS TRANSCEIVER SYSTEM

BACKGROUND OF THE INVENTION

1. Field of the Invention

The present invention relates to eyeglasses and more particularly, to a pair of eyeglasses with a wireless transceiver system.

2. Description of the Related Art

Following fast development of human economic activities, short distance wireless communication technology has been receiving more and more people's attention. Various wireless transceiver systems including wireless communication systems, bluetooth systems, wireless Internet systems, radios, and etc, of low cost and low power consumption have been disclosed and have appeared on the market. Regular wireless communication systems may also provide a voice data transmission function.

Nowadays, various compact hand-free communication and wireless voice transmission systems are commercially available. These compact hand-free communication and wireless voice transmission systems can be directly carried on the user's ear for use. When a wireless communication signal is coming, the user can communicate with the person at the remote side wirelessly without touching any button.

However, it is inconvenient to a person carrying a pair of eyeglasses to use an ear mount type wireless communication system. When putting a wireless communication system one the ear that carries a pair of eyeglasses, the ear bears much pressure and will feel uncomfortable.

SUMMARY OF THE INVENTION

The present invention has been accomplished under the circumstances in view. It is the main object of the present invention to provide a pair of eyeglasses that carries a wireless transceiver for short distance wireless communication. The wireless transceiver can be a regular wireless communication system, bluetooth system, wireless Internet system, or radio.

To achieve this and other objects of the present invention, the eyeglasses comprises an eyeglass frame, the eyeglass frame having a mounting groove at one side thereof, two coupling endpieces respectively extended from two distal ends thereof, a plughole on a middle part thereof adjacent to one side of the mounting groove, and a mounting through hole extending across the mounting groove in communication with one end of the plughole; two temples, the temples each having a front end, a rear end opposite to the front end, a coupling block extending from the front end and respectively pivotally coupled to the coupling endpieces of the eyeglass frame, and a recessed receiving hole near the rear end; a nose unit fastened to the plughole of the eyeglass frame, the nose unit having a through hole; a screw mounted in the mounting through hole of the eyeglass frame and the through hole of the nose unit to secure the nose unit to the eyeglass frame; an eyeglass lens, the eyeglass lens having a ridge inserted into the mounting groove of the eyeglass frame, a retaining notch formed on a middle part of the ridge and forced into engagement with the screw, and two engagement protrusions respectively extending from two distal ends of the ridge and respectively forced into engagement with two distal ends of the mounting groove of the eyeglass frame; and a wireless transceiver mounted on one of the temples.

DETAILED DESCRIPTION OF THE PREFERRED EMBODIMENT

Figure 1:
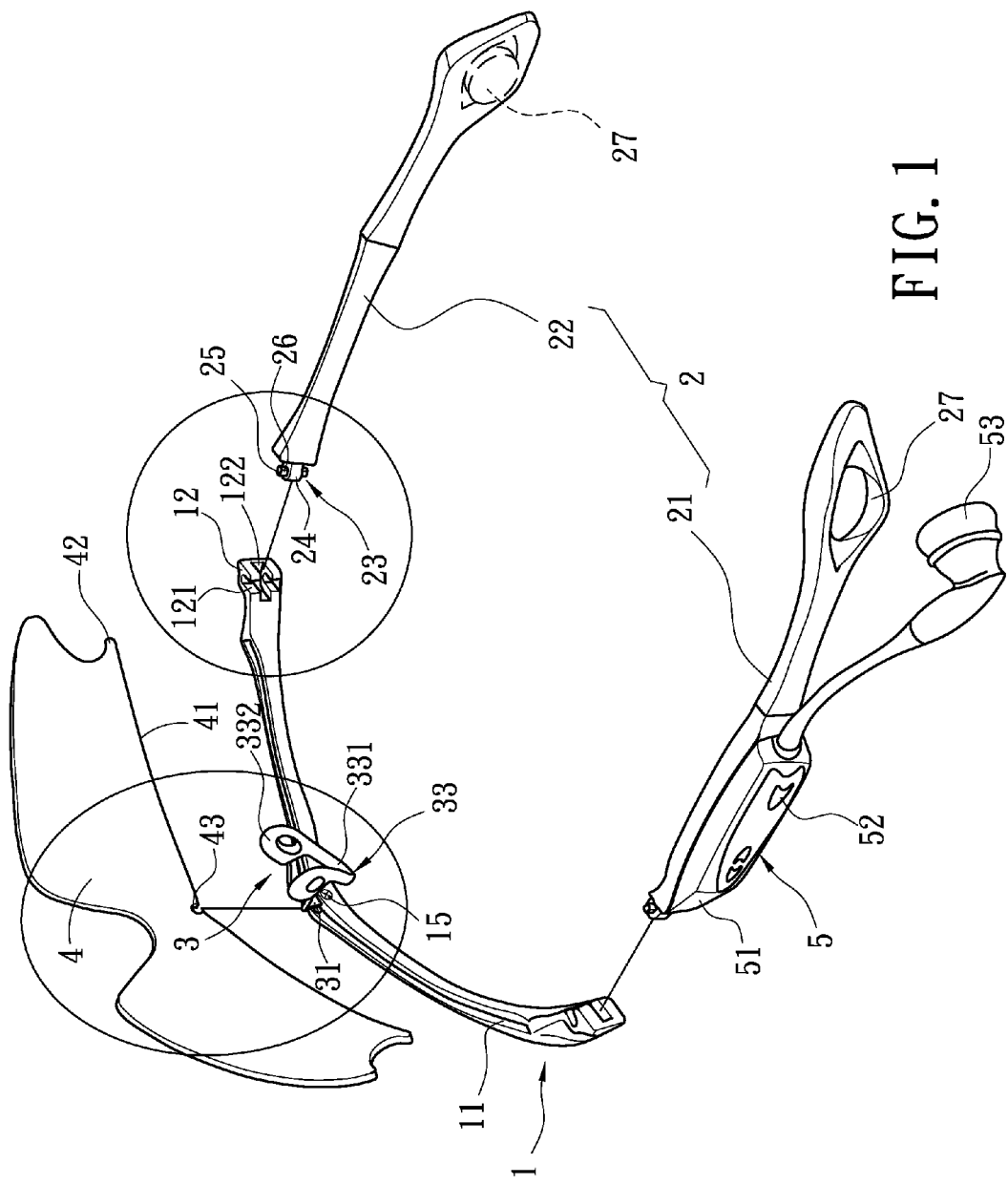
FIG. 1 is an exploded view of a pair of eyeglasses with a wireless transceiver in accordance with the present invention.
Figure 2:
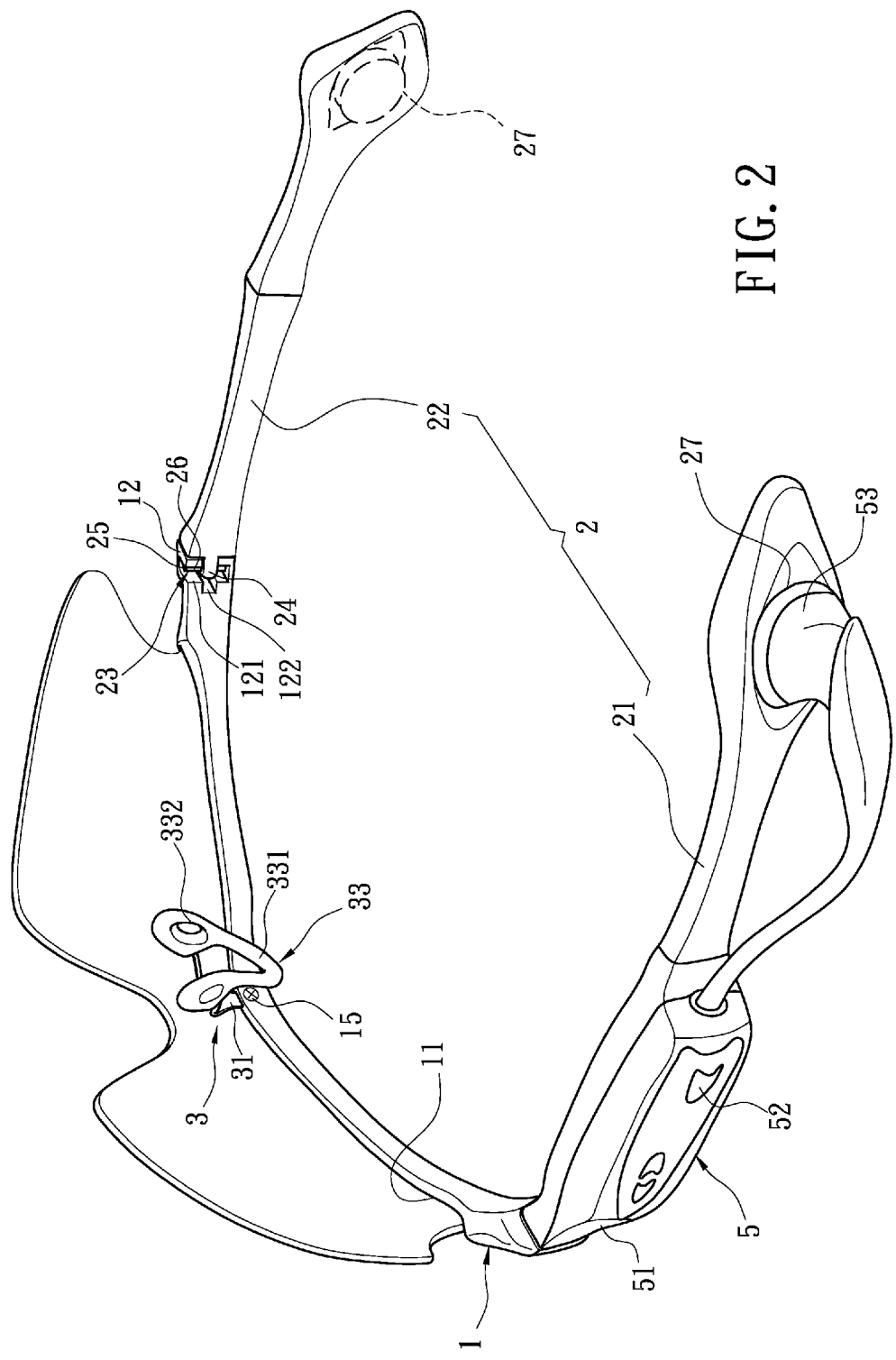
FIG. 2 is an elevational assembly view of the eyeglasses according to the present invention.
Figure 4:
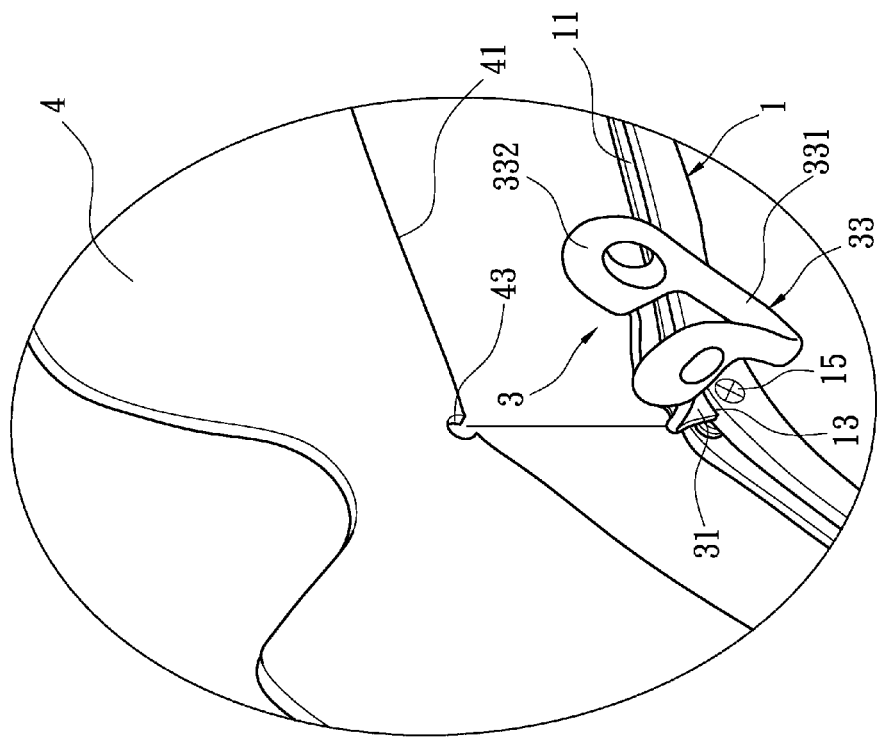
FIG. 4 is an enlarged view of a part of FIG. 1, showing the relationship between the eyeglass lens and the eyeglass frame.
Figure 3:
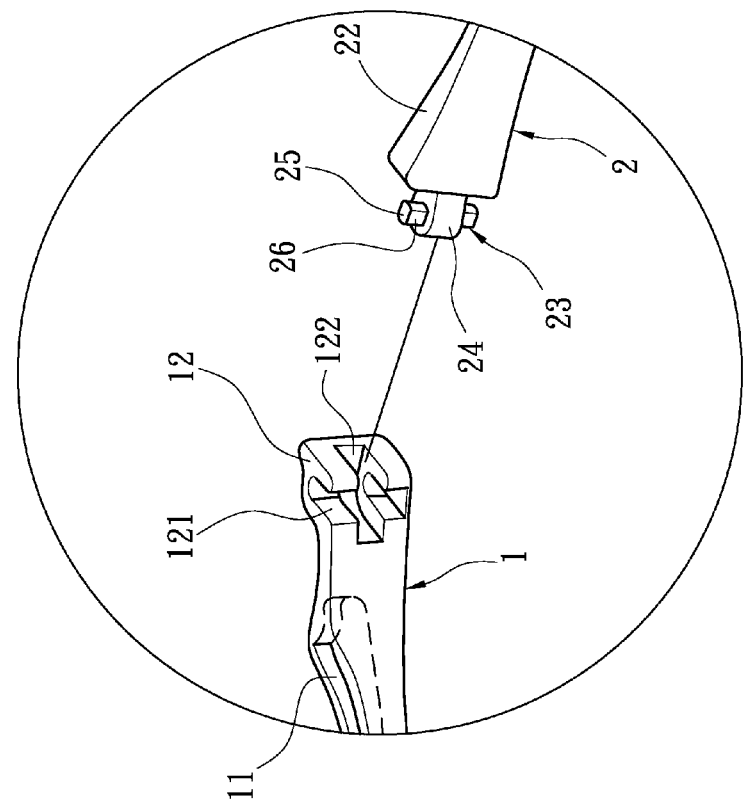
FIG. 3 is an enlarged view of a part of FIG. 1, showing the relationship between one coupling endpiece of the eyeglass frame and the coupling block of the associating temple.

Referring to FIGS. 1~4, a pair of eyeglasses in accordance with the present invention is shown comprising an eyeglass frame 1, a temple set 2 pivoted to the frame 1, a nose unit 3 coupled to the frame 1, a glass lens 4 fastened to the frame 1, and a wireless transceiver 5 arranged on the temple set 2.

The eyeglass frame 1 is a smoothly arched bar molded from a flexible plastic material, having a mounting groove 11 on the bottom side thereof for the positioning of the glass lens 4, two coupling endpieces 12 respectively disposed at the two distal ends thereof for receiving the temple set 2, a plughole 13 vertically disposed on the middle of the bottom side adjacent to the mounting groove 11 (see FIG. 4), and a horizontal mounting through hole 14 extending across the mounting groove 11 in communication with the plughole 13 (see FIG. 4 and also FIG. 5) for the mounting of the nose 3. Each coupling endpiece 12 has a vertical coupling hole 121, and a transverse coupling hole 122 across the vertical coupling hole 121. The vertical coupling hole 121 tilts at a predetermined angle.

The temple set 2 is comprised of a first temple 21 and a second temple 22. The first temple 21 and the second temple 22 are symmetrical, each having a coupling block 23 forwardly protruded from the front end. The coupling block 23 comprises a horizontal base 24, and two vertical pivot pins 25 vertically aligned at the top and bottom sides of the horizontal base 24. The vertical pivot pins 25 are cylindrical pivots each having two cut planes 26 at two opposite sides. By means of the cut planes 26, the coupling block 23 can easily be coupled to one coupling endpiece 12 of the eyeglass frame 1. Each temple 21 or 22 further has a recessed receiving hole 27 near the rear end for receiving an earphone 53 of the wireless transceiver 5. Further, by means of the respective coupling blocks 23, the first temple 21 and the second temple 22 are detachably and exchangeably coupled to the coupling endpieces 12 of the eyeglass frame 1.

The nose unit 3 is mounted in the plughole 13 of the eyeglass frame 1, and a screw 15 is fastened to the horizontal mounting through hole 14 of the eyeglass frame 1 to secure the nose unit 3 and the eyeglass frame 1 together. The nose unit 3 is adjustable in width and height (this adjustment feature will be described further).

The eyeglass lens 4 is a single-piece thermoplastic sunglass lens mounted with the ridge (top edge) thereof into the mounting groove 11 of the eyeglass frame 1, having a retaining notch 43 formed on the middle of the ridge and forced into engagement with the screw 15 and two engagement protrusions 42 respectively extending from the two distal ends of the ridge and respectively forced into engagement with the two distal ends of the mounting groove 11 of the eyeglass frame 1.

The wireless transceiver 5 comprises a casing 51 selectively directly formed integral with one of the two temples 21 and 22 of the temple set 2, a set of control switches 52 mounted on the casing 51 for power on/off and voice volume controls, and the aforesaid earphone 53 extending out of the casing 51. The casing 51 houses a wireless transmitter receiver chip, a rechargeable battery, a microphone, and a battery charger (not shown). When the user carries the eyeglasses on the ears around the eyes, the user can insert the earphone 53 into the associating ear. When not in use, the user can set the earphone 53 into the recessed receiving hole 27.

Figure 5:
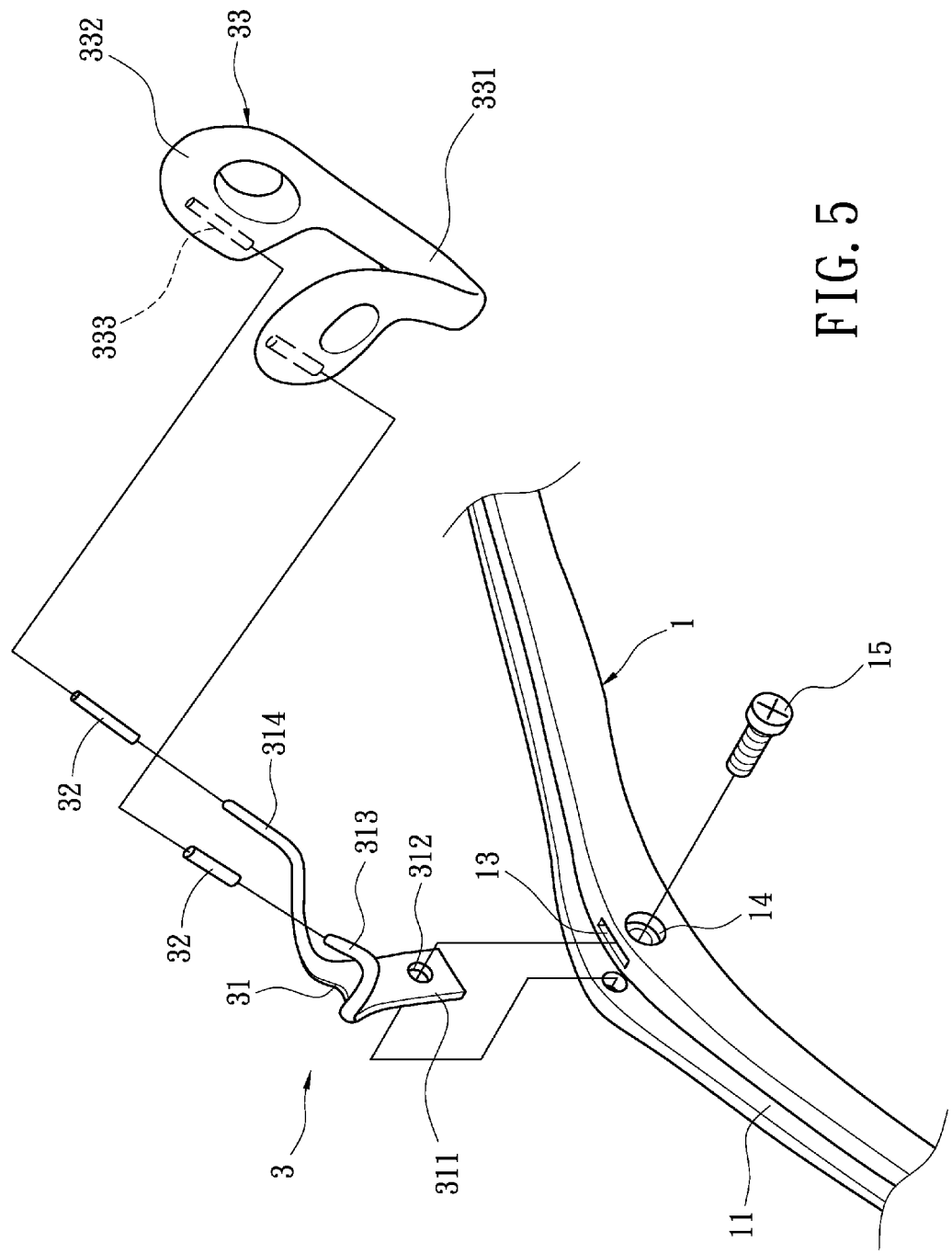
FIG. 5 is an exploded view in an enlarged scale of a part of FIG. 1, showing the structure of the nose unit.

Referring to FIG. 5, the nose unit 3 comprises a metal bracket 31, two sleeves 32, and a nose 33. The metal bracket 31 comprises a base frame 311 inserted into the plughole 13 of the eyeglass frame 1, a through hole 312 cut through the base frame 311 for the passing of the screw 15, and two support rods 313 and 314 respectively symmetrically extending from the top side of the base frame 311. The two sleeves 32 are molded from polycarbonate resin and respectively sleeved onto the support rods 313 and 314. The nose 33 is made out of rubber, having a middle saddle 331 for bridging the user's nose, and two nose pads 332 respectively formed integral with the two ends of the middle saddle 311. The two nose pads 332 each have a coupling hole 333 respectively coupled to the sleeves 32 on the support rods 313 and 314 of the bracket 31. By means of the design of the bracket 31, sleeves 32 and nose 33, the user can adjust the width and height of the nose unit to fit the user's nose.

Figure 6:
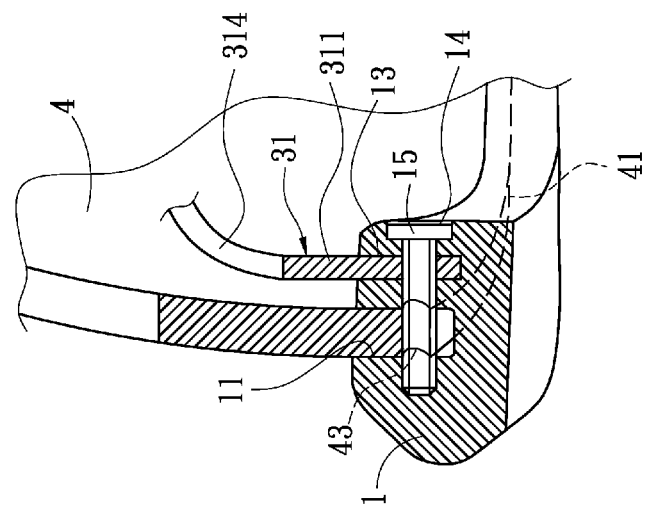
FIG. 6 is a schematic sectional view showing the assembly process of the eyeglass lens and the eyeglass frame according to the present invention (I).
Figure 7:
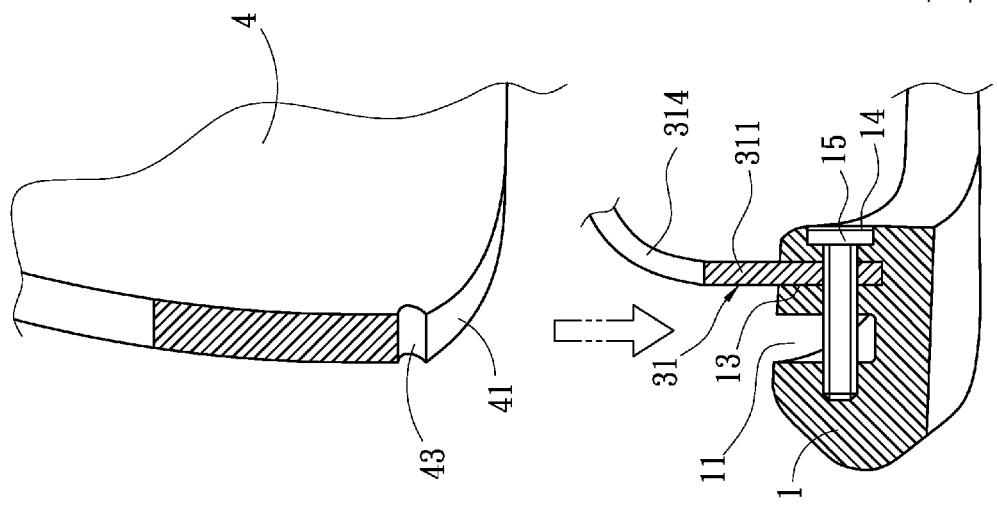
FIG. 7 is a schematic sectional view showing the assembly process of the eyeglass lens and the eyeglass frame according to the present invention (II).
Figure 8:
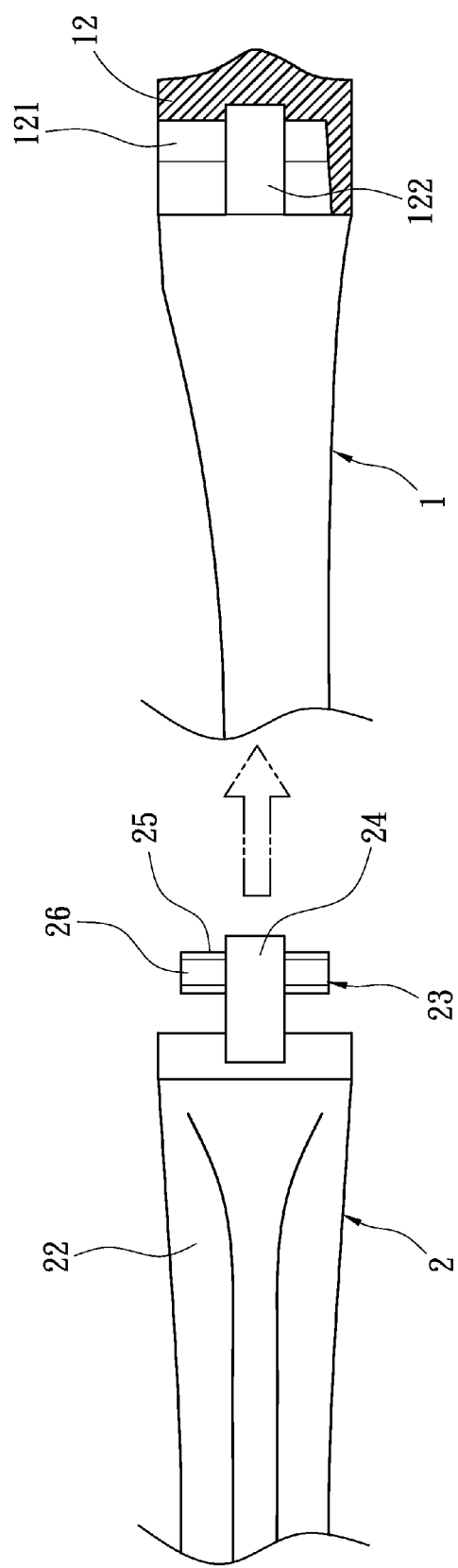
FIG. 8 is a schematic sectional view showing the assembly process of eyeglass frame and the temple according to the present invention (I).
Figure 9:
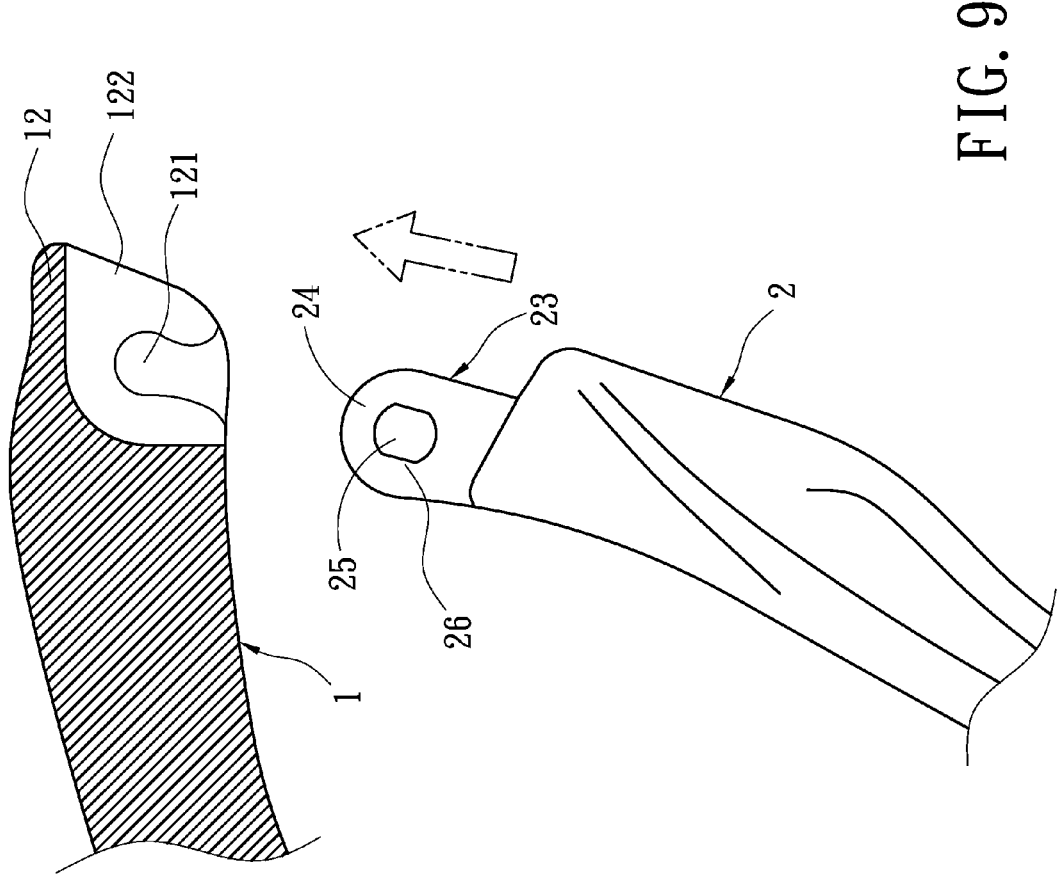
FIG. 9 is a schematic sectional view showing the assembly process of eyeglass frame and the temple according to the present invention (II).
Figure 10:
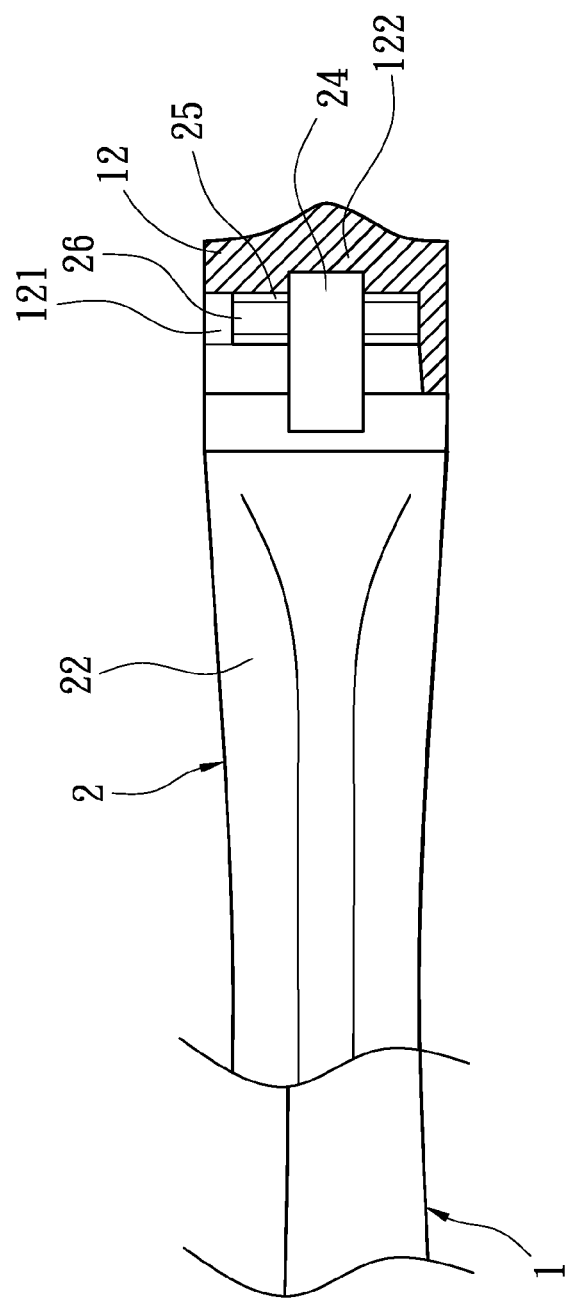
FIG. 10 is a schematic sectional view showing the assembly process of eyeglass frame and the temple according to the present invention (III).
Figure 11:
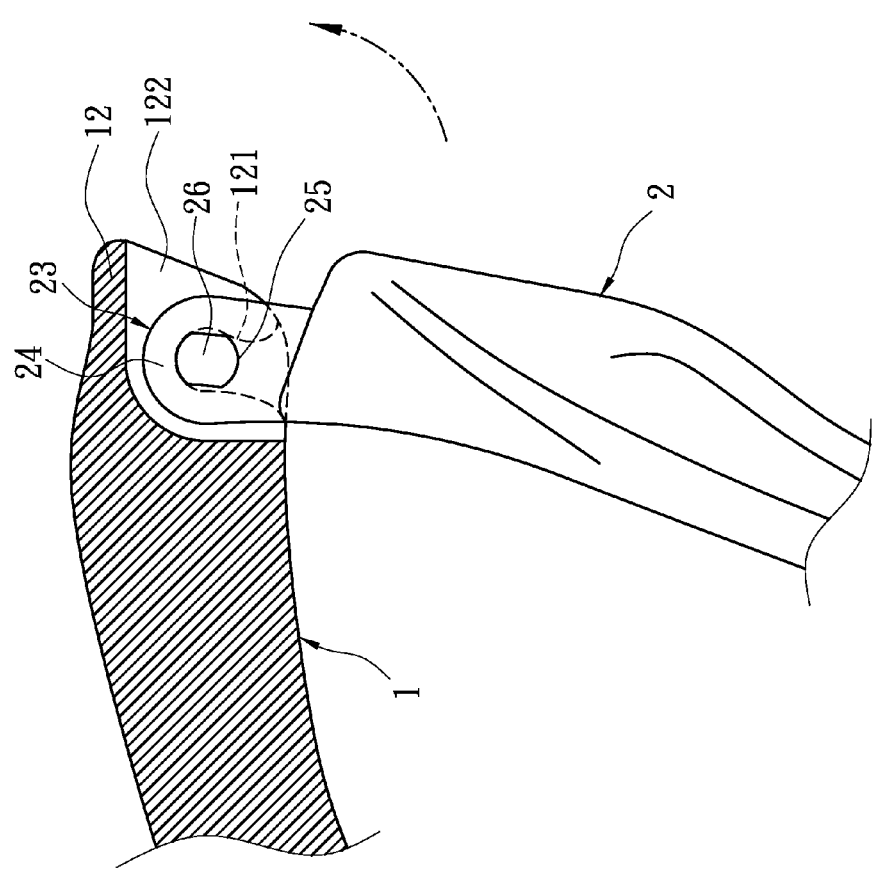
FIG. 11 is a schematic sectional view showing the assembly process of eyeglass frame and the temple according to the present invention (IV).
Figure 12:
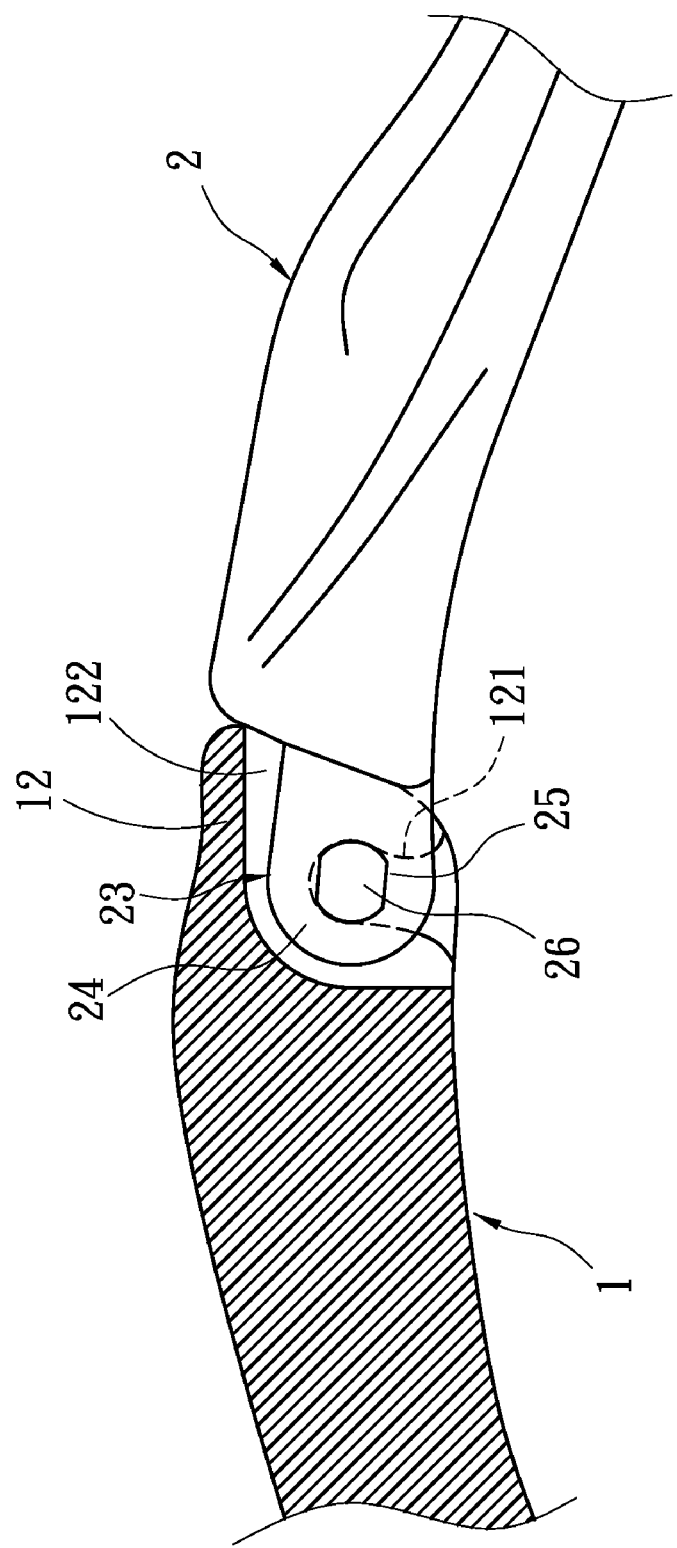
FIG. 12 is a schematic sectional view showing the assembly process of eyeglass frame and the temple according to the present invention (V).

Referring to FIGS. 6 and 7, when inserting the ridge of the eyeglass lens 4 into the mounting groove 11 of the eyeglass frame 1, the retaining notch 43 is forced into engagement with the screw 15 that is mounted in the mounting through hole 14 of the eyeglass frame 1, and therefore the eyeglass lens 4 is secured to the eyeglass frame 1. By pulling the eyeglass lens 4 outwards from the eyeglass frame 1 to disengage the retaining notch 43 from the screw 15, the eyeglass lens 4 is disconnected from the eyeglass frame 1 for a replacement. Further, different colors of eyeglass lenses may be prepared for selection so that the user can selectively attach the desired color of eyeglass lens to the eyeglass frame 1.

Referring to FIGS. 8~12, the coupling block 23 of the temple 21 or 22 is inserted into one coupling endpiece 12 of the eyeglass frame 1 at an angle to force the horizontal base 24 and vertical pivot pins 25 of the coupling block 23 into the horizontal coupling hole 122 and vertical coupling hole 121 of the associating coupling endpiece 12, and then the temple 21 or 22. After the two temples 21 and 22 have been respectively coupled to the coupling endpieces 12 of the eyeglass frame 1, the temples 21 and 22 are respectively turned outwards to the extended position and respectively attached to the user's ears.

Figure 13:
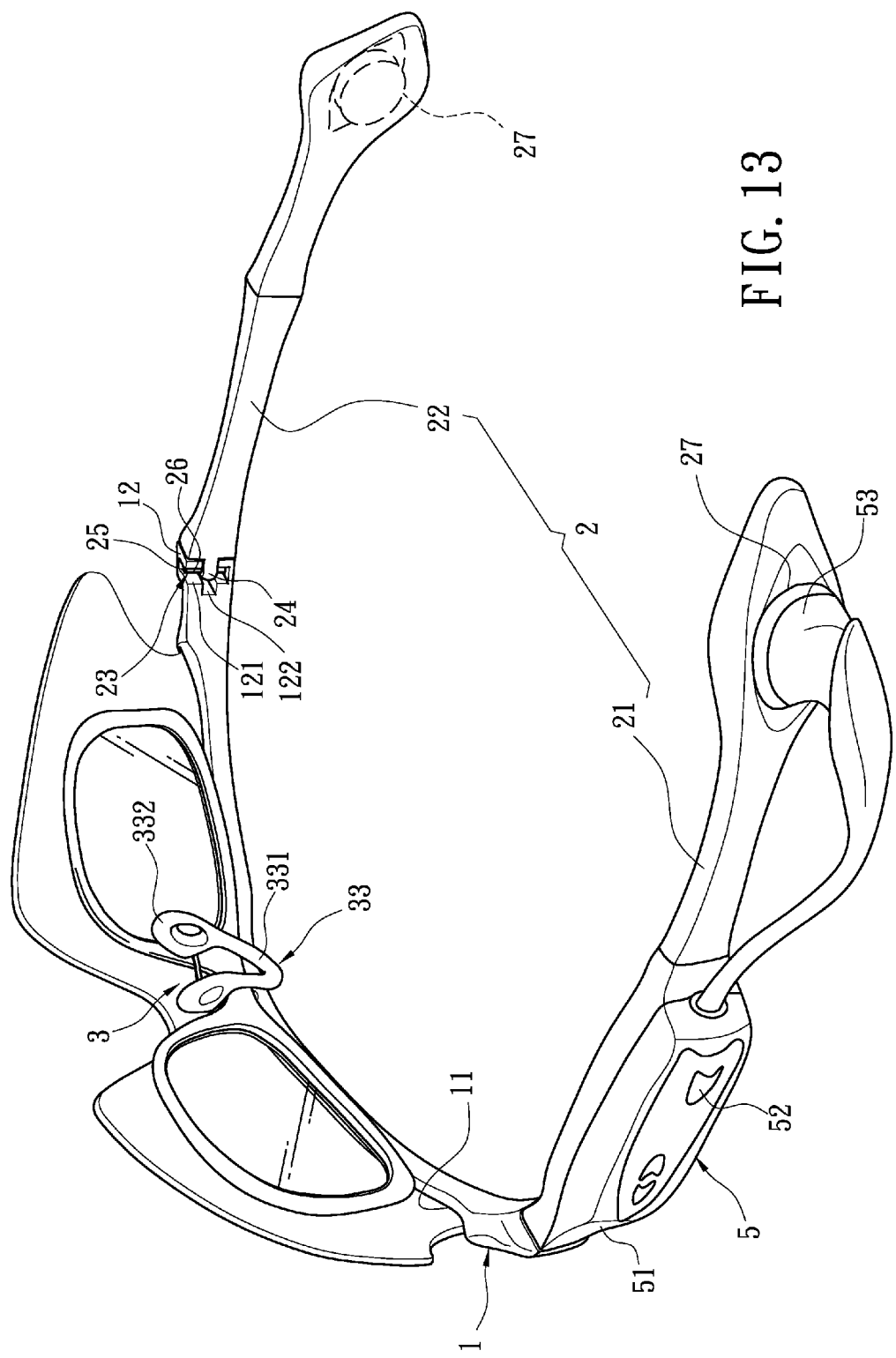
FIG. 13 illustrates a supplementary eyeglass assembly fastened to the nose unit according to the present invention.
Figure 14:
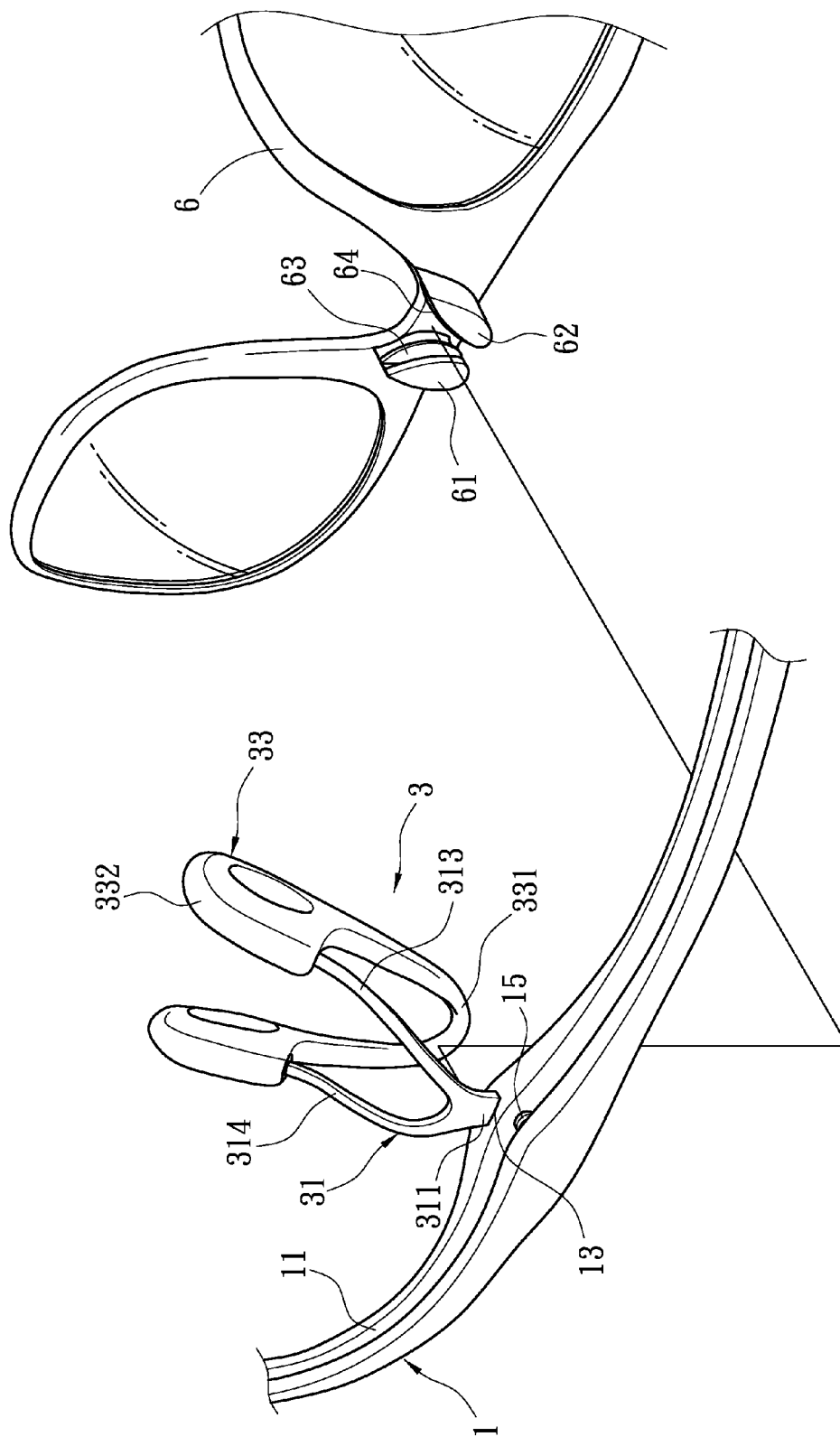
FIG. 14 is an exploded view in an enlarged scale of a part of FIG. 13.
Figure 15:
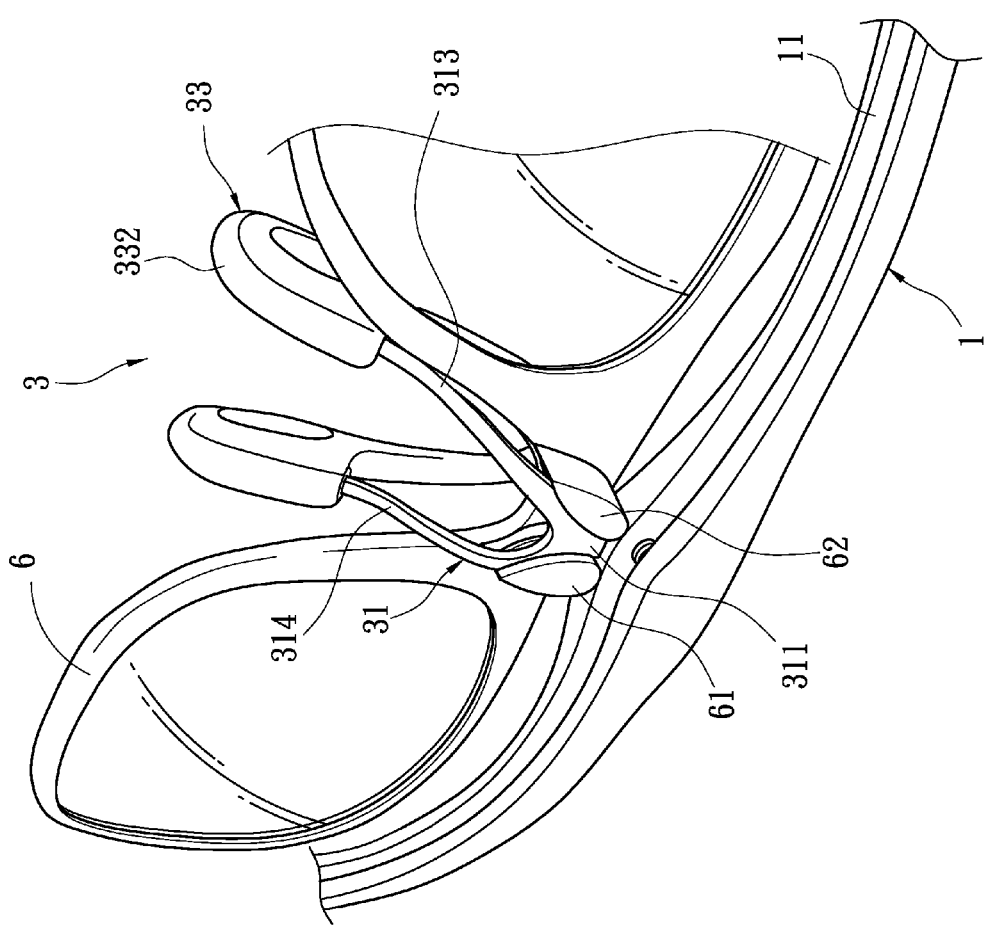
FIG. 15 is an assembly view of FIG. 14.

Referring to FIGS. 13~15, a supplementary eyeglass assembly 6 is detachably secured to the bracket 31 of the nose unit 3. The supplementary eyeglass assembly 6 has two ribs 61 and 62 on the middle of the front side. Each rib 61 or 62 defines a coupling groove 63 or 64 for engagement with the bracket 31 of the nose unit 3. Further, the supplementary eyeglass assembly 6 can be a pair of reading glasses, a pair of distant eyeglasses, or a pair of intermediate glasses.

Figure 16:
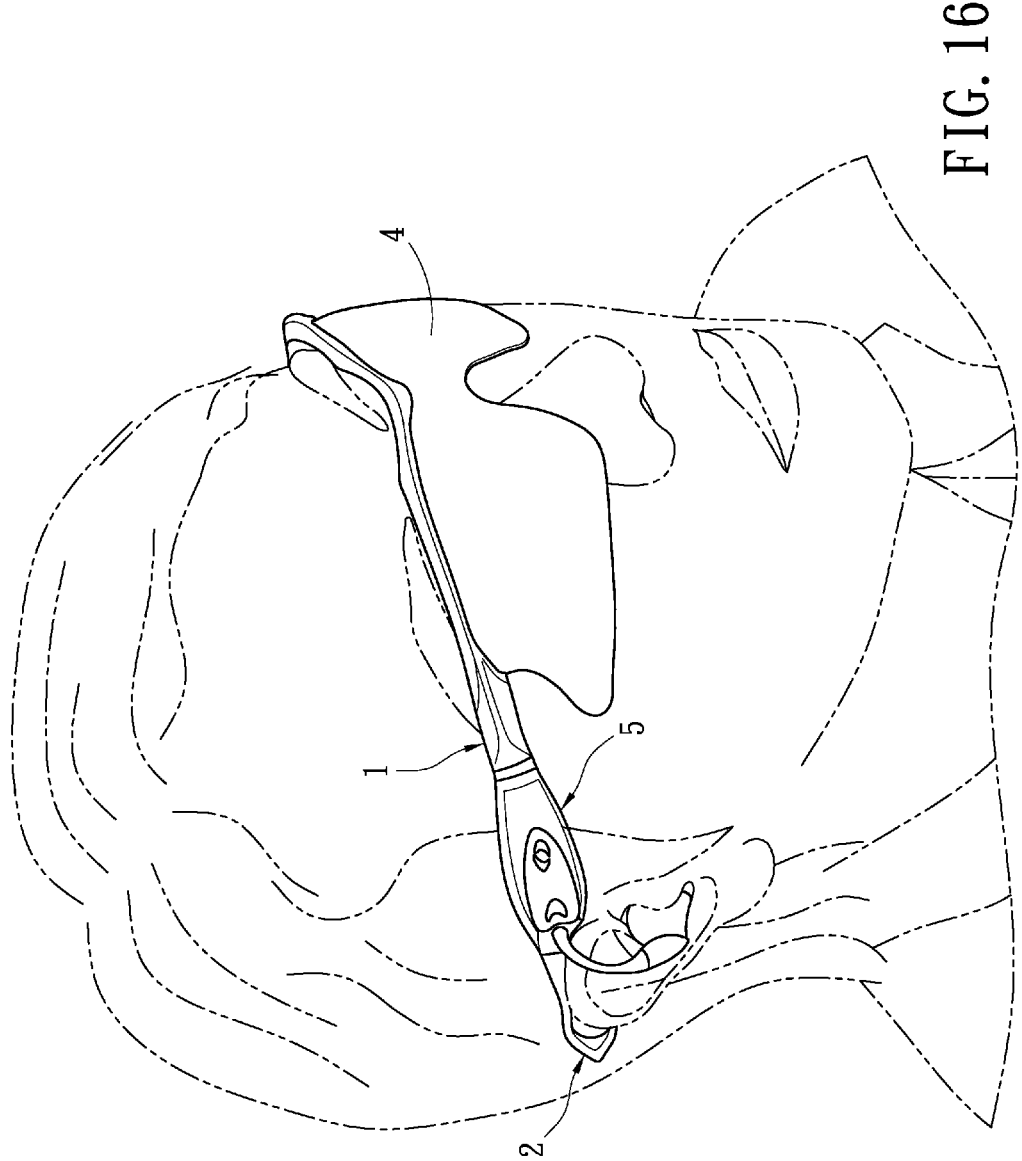
FIG. 16 is a schematic drawing showing the eyeglasses worn on the user's ears according to the present invention.

Referring to FIG. 16, when the user wears the eyeglasses, the earphone 53 of the wireless transceiver 5 is inserted into the corresponding ear so that the user can communication with a person at a remote side through the earphone 53 and the microphone of the wireless transceiver 5 via a cellular phone that is kept in the user's pocket.

Figure 17:
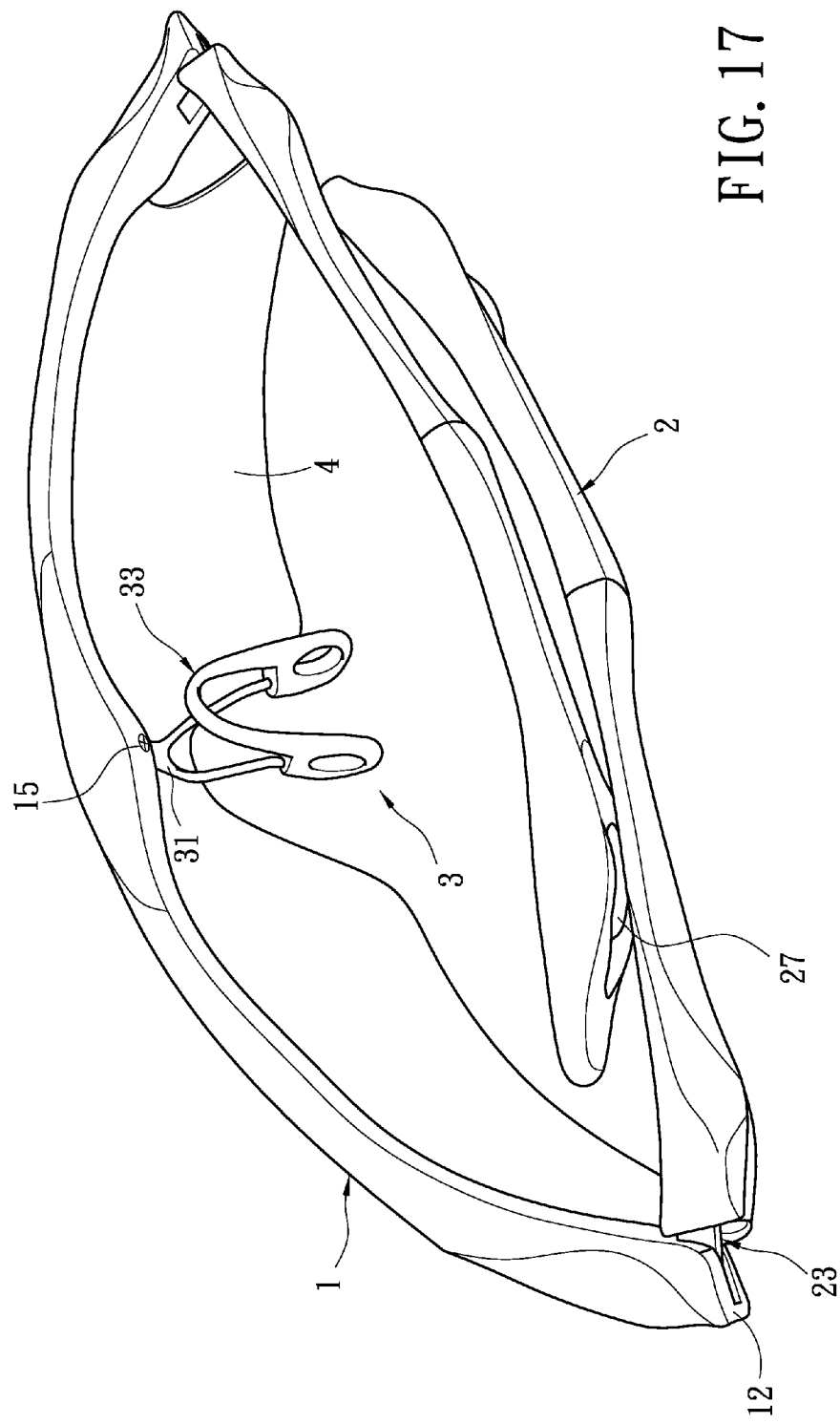
FIG. 17 illustrates the arrangement of the eyeglasses without the wireless transceiver according to the present invention.

Referring to FIG. 17 and FIG. 16 again, the user can detach the first temple 21 with the wireless transceiver 5 from the eyeglass frame 1 and then attach another temple of same structure as the second temple 22 to the eyeglass frame 1 as a substitute, and therefore the eyeglasses is used as a regular eyeglasses or sunglasses without a wireless transceiver.

A prototype of eyeglasses with a wireless transceiver system has been constructed with the features of FIGS. 1~17. The eyeglasses with a wireless transceiver system functions smoothly to provide all of the features discussed earlier.

Although particular embodiments of the invention have been described in detail for purposes of illustration, various modifications and enhancements may be made without departing from the spirit and scope of the invention.

What the invention claimed is:

1. A pair of eyeglasses comprising:

an eyeglass frame, said eyeglass frame having a mounting groove at one side thereof, two coupling endpieces respectively extended from two distal ends thereof, a plughole on a middle part thereof adjacent to one side of said mounting groove, and a mounting through hole extending across said mounting groove in communication with one end of said plughole;

two temples, said temples each having a front end, a rear end opposite to said front end, a coupling block extending from the front end and respectively pivotally coupled to the coupling endpieces of said eyeglass frame, and a recessed receiving hole near said rear end;

a nose unit fastened to the plughole of said eyeglass frame, said nose unit having a through hole;

a screw mounted in the mounting through hole of said eyeglass frame and the through hole of said nose unit to secure said nose unit to said eyeglass frame;

an eyeglass lens, said eyeglass lens having a ridge inserted into the mounting groove of said eyeglass frame, a retaining notch formed on a middle part of said ridge and forced into engagement with said screw, and two engagement protrusions respectively extending from two distal ends of said ridge and respectively forced into engagement with two distal ends of said mounting groove of said eyeglass frame; and a wireless transceiver mounted on one of said temples.

2. The eyeglasses as claimed in claim 1, wherein said eyeglass frame is a smoothly arched bar.

3. The eyeglasses as claimed in claim 2, wherein the coupling block of each of said temples has a horizontal base coupled to a horizontal coupling hole of the associating endpiece of said eyeglass frame, and two vertical pivot pins coupled to the vertical coupling hole of the associating endpiece of said eyeglass frame, said vertical pivot pins each having two cut planes at two opposite sides.

4. The eyeglasses as claimed in claim 1, wherein each coupling endpiece of said eyeglass frame has a vertical coupling hole and a horizontal coupling hole across said vertical coupling hole.

5. The eyeglasses as claimed in claim 1, wherein said nose unit comprises:

a metal bracket, said metal bracket having a base frame inserted into the plughole of said eyeglass frame, the through hole of said nose unit cut through said base frame and coupled to said screw, and two support rods respectively symmetrically extending from a top side of said base frame;

two sleeves molded from polycarbonate resin and respectively sleeved onto the support rods of said bracket; and a nose made out of rubber, said nose having a middle saddle for bridging the user's nose, and two nose pads respectively formed integral with two ends of said middle saddle, said two nose pads each having a coupling hole respectively coupled to said sleeves on said support rods of said bracket.

6. The eyeglasses as claimed in claim 1, wherein said eyeglass lens is a single-piece sunglass lens molded from a thermoplastic material.

7. The eyeglasses as claimed in claim 1, wherein said wireless transceiver comprises a casing formed integral with one of said two temples, a set of control switches mounted on said casing for power on/off and voice volume controls, and an earphone extending out of said casing, said casing housing a wireless transmitter receiver chip, a rechargeable battery, a microphone, and a battery charger.

8. The eyeglasses as claimed in claim 1, further comprising a supplementary eyeglasses detachably secured to a bracket of said nose unit, said supplementary eyeglass assembly having two ribs on a middle part of a front side thereof, said ribs each having a coupling groove respectively forced into engagement with the bracket of said nose unit.

9. The eyeglasses as claimed in claim 1, further comprising a supplementary temple adapted to substitute for the temple carrying said wireless transceiver, said supplementary temple having same structure as said two temples.

10. The eyeglasses as claimed in claim 1, wherein said two temples are exchangeably connectable to the two coupling endpieces of said eyeglass frame.

* * * * *